(12) United States Patent
Xu et al.

(10) Patent No.: US 12,448,289 B2
(45) Date of Patent: Oct. 21, 2025

(54) METHOD OF NITROGEN-PHOSPHORUS DOPED POROUS CARBON FOR OXYGEN REDUCTION ELECTROCATALYSIS WITHIN A WIDE PH RANGE

(71) Applicant: China University of Mining and Technology, Xuzhou (CN)

(72) Inventors: Lang Xu, Xuzhou (CN); Jiawei Qi, Xuzhou (CN); Haishen Jiang, Xuzhou (CN); Peiyao Bai, Xuzhou (CN); Weiqi Liu, Xuzhou (CN); Bailin Jin, Xuzhou (CN); Wendu Zhang, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 746 days.

(21) Appl. No.: 17/775,736

(22) PCT Filed: Jun. 11, 2021

(86) PCT No.: PCT/CN2021/099599
§ 371 (c)(1),
(2) Date: May 10, 2022

(87) PCT Pub. No.: WO2022/142155
PCT Pub. Date: Jul. 7, 2022

(65) Prior Publication Data
US 2023/0271833 A1    Aug. 31, 2023

(30) Foreign Application Priority Data
Dec. 30, 2020 (CN) .......................... 202011600692.5

(51) Int. Cl.
*C01B 32/05* (2017.01)

(52) U.S. Cl.
CPC .......... *C01B 32/05* (2017.08); *C01P 2002/70* (2013.01); *C01P 2002/82* (2013.01);
(Continued)

(58) Field of Classification Search
CPC .. C01B 32/05; C01P 2002/70; C01P 2002/82; C01P 2002/85; C01P 2004/03;
(Continued)

(56) References Cited

FOREIGN PATENT DOCUMENTS

| CN | 104785283 A | 7/2015 |
|---|---|---|
| CN | 109244494 A | 1/2019 |

(Continued)

OTHER PUBLICATIONS

Bolong Liang, "Nitrogen and phosphorus dual-doped carbon derived from chitosan: An excellent cathode catalyst in microbial fuel cell" (Year: 2019).*

(Continued)

*Primary Examiner* — Daniel C. McCracken
*Assistant Examiner* — Starfari Teshawn McClain
(74) *Attorney, Agent, or Firm* — Greenberg Traurig, LLP

(57) ABSTRACT

A preparation method of nitrogen-phosphorus doped porous carbon for oxygen reduction electrocatalysis within a wide pH range, which uses natural mineral-based carbon sources as raw material and uses a sequential nitrogen and phosphorus doping process for synthesizing in two paths. The method provided may be highly cost-effective, sustainable, and suitable for large-scale utilization.

8 Claims, 13 Drawing Sheets

(52) U.S. Cl.
CPC ...... *C01P 2002/85* (2013.01); *C01P 2004/03* (2013.01); *C01P 2004/04* (2013.01); *C01P 2006/12* (2013.01); *C01P 2006/14* (2013.01); *C01P 2006/40* (2013.01)

(58) Field of Classification Search
CPC .............. C01P 2004/04; C01P 2006/12; C01P 2006/14; C01P 2006/40; Y02E 60/50; H01M 4/96
See application file for complete search history.

(56) References Cited

FOREIGN PATENT DOCUMENTS

| | | | | |
|---|---|---|---|---|
| CN | 109678153 A | * | 4/2019 | ........... C01B 32/318 |
| CN | 109841858 A | | 6/2019 | |
| CN | 112499613 A | | 3/2021 | |
| KR | 101141725 B1 | * | 5/2012 | ........... C01B 32/318 |
| WO | 2016164300 A2 | | 10/2016 | |

OTHER PUBLICATIONS

Liang et al., "Nitrogen and phosphorus dual-doped carbon derived from chitosan: an excellent cathode catalyst in microbial fuel cell," Chem. Eng. Jour. (2018).

Zhao et al., "Role of phosphorus in nitrogen, phosphorus dual-doped ordered mesoporous carbon electrocatalyst for oxygen reduction reaction in alkaline media," Intl. Jour. Hydr. Ener. (2017).

\* cited by examiner

| Material | C (at%) | N (at%) | P (at%) | O (at%) | N-6 (%) | N-5 (%) | N-Q (%) | N-O (%) | P-C (%) | P-O (%) |
|---|---|---|---|---|---|---|---|---|---|---|
| $P_4C$-900 | 87.99 | 1.31 | 2.34 | 8.36 | 11.79 | 10.86 | 27.77 | 49.58 | 51.46 | 48.54 |
| $P_4N_4C$-900 | 91.85 | 2.00 | 0.49 | 5.66 | 21.59 | 18.55 | 37.02 | 22.84 | 55.60 | 44.40 |
| $N_4C$-900 | 90.40 | 4.90 | 0.33 | 4.37 | 47.80 | 19.21 | 22.50 | 10.49 | 59.99 | 40.01 |
| $N_4P_4C$-900 | 84.98 | 2.64 | 2.42 | 9.96 | 15.35 | 26.18 | 41.79 | 16.68 | 70.17 | 29.83 |

| Material | $S_{BET}$ (m² g⁻¹) | $S_{micro}$ (m² g⁻¹) | $S_{meso}$ (m² g⁻¹) | $V_{total}$ (cm³ g⁻¹) | $V_{micro}$ (cm³ g⁻¹) | $V_{meso}$ (cm³ g⁻¹) |
|---|---|---|---|---|---|---|
| P₄C-900 | 866.2 | 710.4 | 155.8 | 0.888 | 0.323 | 0.565 |
| P₄N₄C-900 | 1220.7 | 503.2 | 717.5 | 1.135 | 0.273 | 0.862 |
| N₄C-900 | 629.8 | 538.5 | 91.3 | 0.435 | 0.217 | 0.218 |
| N₄P₄C-900 | 845.5 | 661.8 | 183.7 | 0.594 | 0.300 | 0.294 |

METHOD OF NITROGEN-PHOSPHORUS DOPED POROUS CARBON FOR OXYGEN REDUCTION ELECTROCATALYSIS WITHIN A WIDE PH RANGE

CROSS-REFERENCE TO RELATED PATENT APPLICATIONS

This application is a 371 National Stage application of International PCT Application No. PCT/CN2021/099599, filed Jun. 11, 2021, the entire contents of which are hereby incorporated by reference.

TECHNICAL FIELD

The present disclosure belongs to the technical field of inorganic nanomaterials and electrochemistry, particularly relating to a preparation method of nitrogen-phosphorus doped porous carbon for oxygen reduction electrocatalysis within a wide pH range.

BACKGROUND ART

A fuel cell is a kind of clean energy conversion device that can convert chemical energy into electric energy, has high conversion efficiency, and produces little pollutants. For a long time, fuel cells have been considered as one of the effective development approaches for dealing with global environmental problems and energy crisis. However, the slow kinetics of cathodic oxygen reduction reaction (ORR) are still the main obstacle to the large-scale application of fuel cells. At present, platinum-based catalyst materials and other noble metal-based catalyst materials play an important role in accelerating the reaction rate of cathodic catalytic reaction. However, platinum-based materials and noble metal materials often have disadvantages such as high cost, poor durability, and poor anti-poisoning ability, etc. In addition, most of the relevant research focus on the development of electrocatalytic materials in alkaline media. Although the commercial development of acidic fuel cell, such as proton exchange membrane fuel cell, is also crucial, it faces greater challenges because the studied electrocatalytic materials in acidic media generally have problems such as low performance, easy performance degradation and numerous side reactions. Meanwhile, bio-fuel cell may be another kind of promising renewable energy device, but such bio-fuel cells need to rely on internal neutral environment. Therefore, it is highly necessary to develop a substitute for a noble metal electrocatalyst that has high activity, has abundant raw material sources, has long-term stability, will not be affected by media, and is universally applicable within a wide pH range. Alkaline fuel cells, proton exchange membrane fuel cells (in acidic electrolytes) and bio-fuel cells (in neutral electrolytes) are the research object.

Heteroatom-doped carbon materials have obvious advantages: heteroatom-doped carbon materials not only incorporate the excellent structural adjustability, electrical conductivity and chemical/thermal stability of porous carbon, but also bring efficient catalytic sites through unique heteroatom embedding. Simulating computation and experimental data demonstrate that the electron spin density and charge density of adjacent carbons can be redistributed by doping heteroatoms into carbon materials. Meanwhile the chemisorption energy of carbon materials to oxygen molecules and some intermediates can be optimized, and thereby the ORR catalytic activity of heteroatom-doped carbon materials can be improved. Diatomic doping of nitrogen and phosphorus, which are in the same main group, can play a synergistic effect in favor of ORR reactions; phosphorus, which has greater atomic radius, is conducive to spa orbital configuration, which accordingly causes high distortion of the carbon structures and leads to many open edge/defect sites, and can adjust the doping effect of nitrogen as well.

In addition, the pore structures and electrical conductivity of carbon materials are also very important. They can ensure that the carbon materials have highly exposed active sites, rapid proton and electron transfer and interactive catalytic three-phase boundary when the carbon materials are applied to electrochemical reactions. Moreover, the natural substances from the nature, including minerals and ancillary products - coal, coal tar, coal tar pitch, petroleum coke, petroleum pitch and other agricultural and forestry wastes etc., are carbon sources with high cost-effectiveness, abundant reserves, and high quality. At present, natural material-based energy materials, represented by electrode materials for supercapacitors, have been studied to some extent, for example, in Chinese Patents CN109637831A, CN111268675A and CN107610945A. However, the reported research on oxygen reduction electrocatalysts for fuel cells is quite inadequate, especially in the aspect of non-noble metal catalyst materials applicable in a wide pH range.

In view of the great research value and application potential of oxygen reduction electrocatalysts, it is of great practical significance to develop a preparation method for synthesizing high-efficiency electrocatalysts from natural materials that is simple, sustainable, and suitable for large-scale production. Such a preparation method not only explores the potential value of natural materials, but also meets the environmental protection requirement for clean utilization. In the present disclosure, a nitrogen-phosphorus doped porous carbon material can be obtained through a two-step pyrolysis process: (1) using natural mineral-based carbon sources represented by coal, and (2) regulating the chemical reaction sequence. Thanks to the abundant active species related to nitrogen and phosphorus and an excellent multi-scale pore system, the synthesized metal-free carbon material has a remarkable oxygen reduction electrocatalytic effect within a wide pH range, and has a better development prospect.

DETAILED DESCRIPTION

Figure 1:
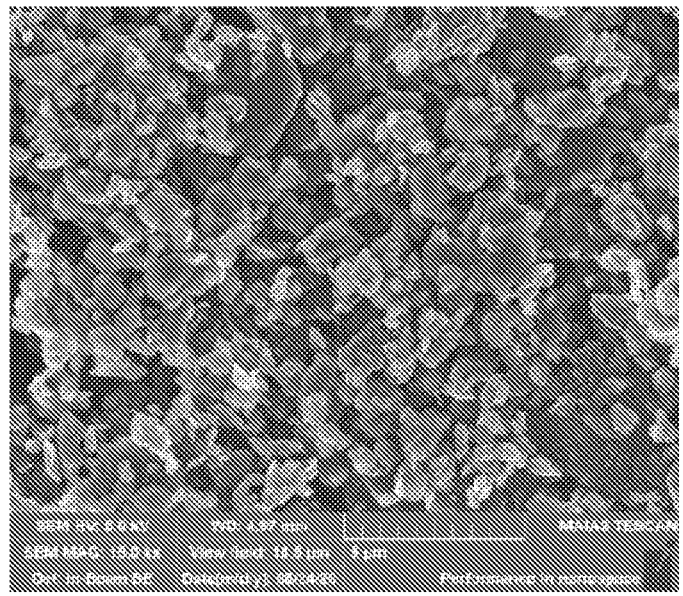
FIG. 1 is a low-power scanning electron microscope (SEM) image of the nitrogen-phosphorus doped porous carbon N4P4C-900 prepared in example 2 of the present disclosure.

To address the problems existing in the prior art, the present disclosure provides a method of nitrogen-phosphorus doped porous carbon material for oxygen reduction electrocatalysis within a wide pH range. This effectively avoids problems arising in the prior art by being highly cost-effective, green and sustainable, and scalable.

The present disclosure adopts the following technical solution for preparing natural mineral-based nitrogen-phosphorus doped porous carbon:

First, cleaning and drying natural mineral-based carbon sources, and then mixing them for ball milling at 400-600 rpm; pre-carbonizing in a shielding gas; alkaline washing of the carbonized material with 2-3 mol·L$^{-1}$ potassium hydroxide solution at 80-90° C. for 1-3 hours, filtering, and washing with water till the filtrate is neutral; pickling with 4-6 mol·L$^{-1}$ dilute hydrochloric acid solution at 50-60° C. for 1-3 hours, filtering, washing with water till the filtrate is neutral, and drying the product, so that a pretreated carbon source to be doped is obtained. The example natural mineral-based carbon source is one or more of coal, coal pitch, coal tar, petroleum pitch and petroleum coke, and the carbonization temperature is 650° C., Second, weighing the carbon material to be doped in the previous step, a nitrogen dopant and an activator respectively at a mass ratio of 1:(2-6):(1-3), milling and well mixing, and then transferring the mixture into a tube furnace, carbonizing at 850-1,050° C. for 1-4 hours in a nitrogen atmosphere with a heating rate of 2-20° C.·min$^{-1}$, taking out after the carbonization is completed, and then pickling, filtering, washing with water, and drying, so that a nitrogen-doped carbon is obtained. The example nitrogen dopant is one or more of melamine, dicyandiamide, urea, pyridine, pyrrole, aniline, amino acid and purine, and the activator is one or more of potassium hydroxide, sodium hydroxide, potassium bicarbonate, sodium bicarbonate, potassium carbonate and sodium carbonate. The example mass ratio of the carbon to be doped (pretreated natural mineral-based carbon source or primary phosphorus-doped carbon) to the nitrogen dopant to the activator is 1:4:2

Third, weighing the carbon to be doped in the previous step and a phosphorus dopant respectively at a mass ratio of 1:(3-5), adding water for dilution and mixing, then drying and transferring the mixture into a tube furnace, carbonizing at 850-1,050° C. for 1-4 hours in a nitrogen atmosphere at a heating rate of 2-20° C.·min$^{-1}$, and then pickling, filtering, washing with water, and drying, so that a phosphorus-doped carbon is obtained. The example phosphorus dopant is one or more of phosphoric acid, triphenylphosphine, phytic acid, red phosphorus, black phosphorus, dipotassium hydrogen phosphate, potassium dihydrogen phosphate, disodium hydrogen phosphate, sodium dihydrogen phosphate, magnesium phosphate, calcium phosphate, ammonium dihydrogen phosphate and diammonium hydrogen phosphate. The example sample and the phosphorus dopant are subjected to ultrasonic mixing, and the specific ultrasonic parameters are 25 Hz (5 min), 33 Hz (10 min), 40 Hz (5 min), 59 Hz (10 min), and the total time is 0.5 h. Furthermore, the mass ratio of the carbon to be doped (primary nitrogen-doped carbon or pretreated natural mineral-based carbon source) to the phosphorus dopant is 1:4.

In the example second and third steps, the carbonization temperature is 900° C., the carbonization time in the nitrogen doping process is 2 hours, and the carbonization time in the phosphorus doping process is 1 hour. The example heating rate of the tube furnace is 3° C.·min$^{-1}$.

Fourth, pickling the twice carbonization product obtained through the above steps in a sequence of (1), (2), (3) or (1), (3), (2) with 1 mol·L$^{-1}$ dilute hydrochloric acid solution at 40-60° C. for 1-3 hours, then filtering, washing with water till the filtrate is neutral, and drying, so that the nitrogen-phosphorus doped porous carbon material is obtained. The example nitrogen content and phosphorus content in a representative nitrogen-phosphorus doped porous carbon prepared through a process of nitrogen doping followed by phosphorus doping are 2.5-3.0% and 2.0-2.5% respectively, the ratio of graphite nitrogen to pyridine nitrogen is 2-3, the ratio of P—C bonds to P—O bonds is 2-2.5, and all of them can be controlled accurately. The nitrogen content and phosphorus content in a representative nitrogen-phosphorus doped porous carbon prepared through a process of phosphorus doping followed by nitrogen doping are about 2.0% and 0.5% respectively, and the ratio of graphite nitrogen to pyridine nitrogen is 1.5-2.0, and the proportion of P—C bonds is greater than that of P—O bonds.

The specific surface area of a representative nitrogen-phosphorus doped porous carbon prepared through a process of nitrogen doping followed by phosphorus doping is controlled to be 820-860 m$^2$·g$^{-1}$, including micropores of 650-670 m$^2$·g$^{-1}$ and mesopores of 170-190 m$^2$·g$^{-1}$. The specific surface area of a representative nitrogen-phosphorus doped porous carbon prepared through a process of phosphorus doping followed by nitrogen doping is controlled to be 1,200-1,240 m$^2$·g$^{-1}$, including micropores of 500-510 m$^2$·g$^{-1}$ and mesopores of 700-730 m$^2$·g$^{-1}$. All of them can be controlled accurately.

Compared with the prior art, the present disclosure may have at least some of the following beneficial effects:

First, in the present disclosure, natural mineral-based carbon sources, which have low costs and abundant reserves in the earth, are used as raw materials, and two types of nitrogen-phosphorus doped porous carbon materials can be prepared sustainably by regulating the chemical reaction sequence. The preparation process is simple and feasible, has a low cost, can explore the intrinsic value of natural substances, and meets the requirement for clean production and sustainable utilization.

Second, in the present disclosure, final nitrogen-phosphorus doped carbon material is synthesized through a nitrogen doping step and a phosphorus doping step respectively. In the nitrogen doping step, the nitrogen dopant and the activator can act synergistically at high temperature, an appropriate amount of nitrogen atoms are doped efficiently into the skeletons of the carbon obtained from natural source, and abundant pore structures are created simultaneously; in the phosphorus doping step, the high temperature etching of the phosphorus dopant can embed some phosphorus atoms in the carbon plane by replacing some carbon atoms or removing some doped nitrogen atoms, additional defects/edge sites are created by removing nitrogen atoms and reshaping lattice, and phosphorus-doped active species are provided simultaneously, nitrogen-doped species are optimized, and the pore structures are expanded again. Therefore, the optimized nitrogen-phosphorus doped carbon material has high proportions of graphite nitrogen, P—C bonds and defects as the main active species; a large quantity of micropores provide sites for catalytic reactions to take place, appropriate mesopores provide guarantee for the transfer of catalysis-related substances, and the excellent flaky morphology is conducive to charge transfer.

Third, the representative carbon material N$_4$P$_4$C-900, which is prepared through a process of nitrogen doping followed by phosphorus doping, has a regular flaky morphology, abundant defect sites and edge layers, high specific surface area of 845.5 m$^2$·g$^{-1}$, an excellent ratio of micropores to mesopores (the specific surface areas of micropores and mesopores are 661.8 m$^2$·g$^{-1}$ and 183.7 m$^2$·g$^{-1}$ respectively), effective content of doped nitrogen (2.64%) and effective content of doped phosphorus (2.42%), optimized graphite nitrogen configuration and P—C bonding sites, and remarkable electrolyte wettability. Thus for oxygen reduction electrocatalysis, it can provide sufficient catalytic active sites, effective electrochemical specific surface area and transport channels of related substances.

Fourth, the two types of optimized carbon materials obtained through a "sequential nitrogen and phosphorus doping process", both exhibit excellent electrochemical performance as electrocatalysts for oxygen reduction reactions within a wide pH range, especially N$_4$P$_4$C-900. At standard hydrogen potential, in alkaline potassium hydroxide electrolyte, N$_4$P$_4$C-900 has 0.97 V initial potential, 0.85 V half-wave potential, and 6.36 mA·cm$^{-2}$ limiting current density; in acidic sulfuric acid electrolyte, N$_4$P$_4$C-900 has 0.82 V initial potential, 0.65 V half-wave potential, and 6.48 mA·cm$^{-2}$ limiting current density; in neutral phosphate buffer electrolyte, N$_4$P$_4$C-900 has 0.87 V initial potential, 0.67 V half-wave potential, and 7.12 mA·cm$^{-2}$ limiting current density. In addition, N$_4$P$_4$C-900 has a low hydrogen peroxide output and a catalytic reaction path of approximate four-electron. These catalytic properties are comparable to those of commercial platinum-carbon catalysts under corresponding conditions.

Fifth, due to the reasonable pore structures and optimized graphite nitrogen and phosphorus-carbon species, N$_4$P$_4$C-900 has better cycle stability and impurity poisoning resistance than commercial platinum-carbon catalysts. Moreover, N$_4$P$_4$C-900 has outstanding power density and discharge performance in zinc-air cells.

EXAMPLES

To understand the technical scheme and advantages of the present disclosure more clearly, the present disclosure will be further detailed with reference to the embodiments. The example embodiments described below are only provided to explain the present disclosure and shall not be deemed as constituting any limitation to the present disclosure. In the embodiments described below, the natural mineral-based raw materials are similarly pretreated.

In a first example embodiment, pretreated coal and phosphoric acid were weighed respectively at a mass ratio of 1:4, diluted with water and mixed ultrasonically, the specific ultrasonic parameters were 25 Hz (5 min), 33 Hz (10 min), 40 Hz (5 min) and 59 Hz (10 min), the total time of ultrasonic mixing was 0.5 hour, then the mixture was dried and transferred into a tube furnace, and carbonized at 900° C. for 1 hour in a nitrogen atmosphere at a heating rate of 3° C.·min$^{-1}$, then the product was taken out, pickled with acid, filtered, washed with water, and dried, so that a phosphorus-doped carbon $P_4C$-900 was obtained; the phosphorus-doped carbon, melamine and potassium hydroxide were weighed respectively at a mass ratio of 1:4:2, and milled and mixed homogeneously, the mixture was transferred into a tube furnace, and carbonized at 900° C. for 2 hours at a heating rate of 3° C.·min$^{-1}$ in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $P_4N_4C$-900 was obtained.

In a second example embodiment, pretreated coal, melamine and potassium hydroxide were weighed respectively at a mass ratio of 1:4:2, and milled and mixed homogeneously, the mixture was transferred into a tube furnace, and carbonized at 900° C. for 2 hours at a heating rate of 3° C.·min$^{-1}$ in a nitrogen atmosphere, then the carbonized product was taken out, pickled with acid, filtered, washed with water, and dried, so that a nitrogen-doped carbon $N_4C$-900 was obtained; the nitrogen-doped carbon and phosphoric acid were weighed respectively at a mass ratio of 1:4, diluted with water and mixed ultrasonically, the specific ultrasonic parameters were 25 Hz (5 min), 33 Hz (10 min), 40 Hz (5 min) and 59 Hz (10 min), the total time of ultrasonic mixing was 0.5 hour, then the mixture was dried and transferred into a tube furnace, and carbonized at 900° C. for 1 hour in a nitrogen atmosphere at a heating rate of 3° C.·min$^{-1}$, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C$-900 was obtained.

In a third example embodiment, pretreated coal, melamine and potassium hydroxide were weighed respectively at a mass ratio of 1:4:2, and milled and mixed homogeneously, the mixture was transferred into a tube furnace, and carbonized at 900° C. for 2 hours at a heating rate of 3° C.·min$^{-1}$ in a nitrogen atmosphere, then the carbonized product was taken out, pickled with acid, filtered, washed with water, and dried, so that a nitrogen-doped carbon $N_4C$-900 was obtained; the nitrogen-doped carbon and phosphoric acid were weighed respectively at a mass ratio of 1:4 and directly mixed, and dried, then the mixture was transferred into a tube furnace, and carbonized at 900° C. for 1 hour at a heating rate of 3° C.·min$^{-1}$ in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C$-900-d was obtained.

In a fourth example embodiment, pretreated coal, melamine and potassium hydroxide were weighed respectively at a mass ratio of 1:2:2, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_2P_4C$-900 was obtained.

In a fifth example embodiment, pretreated coal, melamine and potassium hydroxide were weighed respectively at a mass ratio of 1:6:2, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_6P_4C$-900 was obtained.

In a sixth example embodiment, pretreated coal, melamine and potassium hydroxide were weighed respectively at a mass ratio of 1:4:1, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C_1$-900 was obtained.

In a seventh example embodiment, pretreated coal, melamine and potassium hydroxide were weighed respectively at a mass ratio of 1:4:3, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C_3$-900 was obtained.

In an eighth example embodiment, pretreated coal, melamine and potassium hydroxide were weighed respectively at a mass ratio of 1:4:2, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:3, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_3C$-900 was obtained.

In a ninth example embodiment, pretreated coal, melamine and potassium hydroxide were weighed respectively at a mass ratio of 1:4:2, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:5, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_5C$-900 was obtained.

In a tenth example embodiment, pretreated coal, melamine and potassium hydroxide were weighed respectively at a mass ratio of 1:4:2, and milled and mixed homogeneously, the mixture was transferred into a tube furnace, and carbonized at 850° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 850° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C$-850 was obtained.

In a eleventh example embodiment, pretreated coal, melamine and potassium hydroxide were weighed respectively at a mass ratio of 1:4:2, and milled and mixed homogeneously, the mixture was transferred into a tube furnace, and carbonized at 950° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 950° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C$-950 was obtained.

In a twelfth example embodiment, pretreated coal, melamine and potassium hydroxide were weighed respectively at a mass ratio of 1:4:2, and milled and mixed homogeneously, the mixture was transferred into a tube furnace, and carbonized at 1,050° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 1,050° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried, so that a nitrogen-phosphorus doped porous carbon material $N_4P_4C$-1050 was obtained.

In a thirteenth example embodiment, other pretreated carbon sources (coal pitch, coal tar, petroleum pitch, and petroleum coke), melamine and potassium hydroxide were weighed respectively at a mass ratio of 1:4:2, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried; thus, a series of nitrogen-phosphorus doped porous carbon materials were obtained.

In a fourteenth example embodiment, pretreated coal, other nitrogen dopants (dicyandiamide, urea, pyridine, pyrrole, aniline, amino acid and purine) and potassium hydroxide were weighed respectively at a mass ratio of 1:4:2, milled and mixed homogeneously, then the mixture was transferred into a tube furnace, and carbonized at 900° C. for 2 hours in a nitrogen atmosphere, then the carbonized product was taken out after the carbonization is finished, pickled with acid, filtered, washed with water and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried; thus, a series of nitrogen-phosphorus doped porous carbon materials were obtained.

In a fifteenth example embodiment, pretreated coal, melamine and other activators (sodium hydroxide, potassium bicarbonate, sodium bicarbonate, potassium carbonate and sodium carbonate) were weighed respectively at a mass ratio of 1:4:2, milled and mixed homogeneously, then the mixture was transferred into a tube furnace, and carbonized at 900° C. for 2 hours in a nitrogen atmosphere, then the carbonized product was taken out after the carbonization is finished, pickled with acid, filtered, washed with water and dried, so that a nitrogen-doped carbon was obtained; the nitrogen-doped carbon and phosphoric acid were weighed respectively at a mass ratio of 1:4, diluted with water, mixed ultrasonically, and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried; thus, a series of nitrogen-phosphorus doped porous carbon materials were obtained.

In a sixteenth example embodiment, pretreated coal, melamine and potassium hydroxide were weighed respectively at a mass ratio of 1:4:2, and milled and mixed homogeneously, the mixture was transferred into a tube furnace, and carbonized at 900° C. for 2 hours in a nitrogen atmosphere, then the carbonized product was taken out after the carbonization is finished, pickled with acid, filtered, washed with water, and dried, so that a nitrogen-doped carbon was obtained; the nitrogen-doped carbon and other phosphorus dopants (triphenylphosphine, phytic acid, red phosphorus, black phosphorus, dipotassium hydrogen phosphate, potassium dihydrogen phosphate, disodium hydrogen phosphate, sodium dihydrogen phosphate, magnesium phosphate, calcium phosphate, ammonium dihydrogen phosphate and diammonium hydrogen phosphate) were weighed respectively at a mass ratio of 1:4, diluted with water, mixed ultrasonically and dried, then the mixture was transferred into a tube furnace, and carbonized at 900° C. for 1 hour in a nitrogen atmosphere, so that a secondarily carbonized product was obtained; the secondarily carbonized product was pickled with 1 mol·L$^{-1}$ dilute hydrochloric acid solution at 40-60° C. for 1-3 hours, filtered, washed with water till the filtrate is neutral, and dried; thus, a series of nitrogen-phosphorus doped porous carbon materials were obtained.

The foregoing are examples of the present disclosure, and the present disclosure is not limited to the contents of these examples. For the person skilled in the art, there can be various changes and modifications within the conception scope of the technical scheme of the disclosure, and any change or modification shall be deemed as falling in the scope of protection of the present disclosure. The comparative embodiments described below are only provided to explain extensions of the present disclosure and shall not be deemed as constituting any limitation to the present disclosure.

In a first comparative example embodiment, milled biomass was used as a raw material, and carbonized at 500° C. for 1 hour and cooled, so that a pre-carbonized material was obtained; potassium hydroxide, potassium bicarbonate and the pre-carbonized material were mixed at a mass ratio of 2:1:1, and melamine was doped to achieve a nitrogen doping amount of 5%; deionized water was added after the mixing, the mixture was soaked in water bath at 80° C. and then dried, so that a nitrogen-doped carbon was obtained; the nitrogen-doped carbon was activated at 800° C. in a nitrogen atmosphere for 2.67 hours, cooled, taken out and milled; then 5% sodium phosphite was placed in the upstream of a tube furnace, and the nitrogen-doped carbon obtained in the previous step was placed in the downstream, they were kept at 300° C. for reaction for 2 hours; the product was cooled to room temperature, taken out, milled, pickled with acid and washed with water to a neutral state, and dried, so that a biomass-based nitrogen-phosphorus doped carbon 1 was obtained.

In a second comparative example embodiment, 6 mmol melamine, 910 μL phytic acid and 10 mL deionized water were mixed homogeneously at room temperature to obtain a hydrogel; the hydrogel was freeze-dried to obtain white powder; the white powder was carbonized at 1,000° C. for 2 hours at a heating rate of 2° C.·min$^{-1}$ in an argon atmosphere, so that a nitrogen-phosphorus doped carbon 2 was obtained.

In a third comparative example embodiment, 2 g potassium phytate was calcined at 800° C. for 1 hour in a nitrogen atmosphere at a heating rate of 3° C.·min$^{-1}$; the calcined material was cooled naturally, and then treated with hydrochloric acid at room temperature for 18 hour and washed with deionized water to a neutral state, and the precipitate was dried, so that a phosphorus-doped carbon was obtained; then 0.1 g phosphorus-doped carbon and 2 g melamine were milled and mixed, then the mixture was subjected to heat treatment at 1,000° C. for 2 hours, washed with water, and centrifuged and dried, so that a nitrogen-phosphorus doped carbon 3 was obtained.

Figure 2:
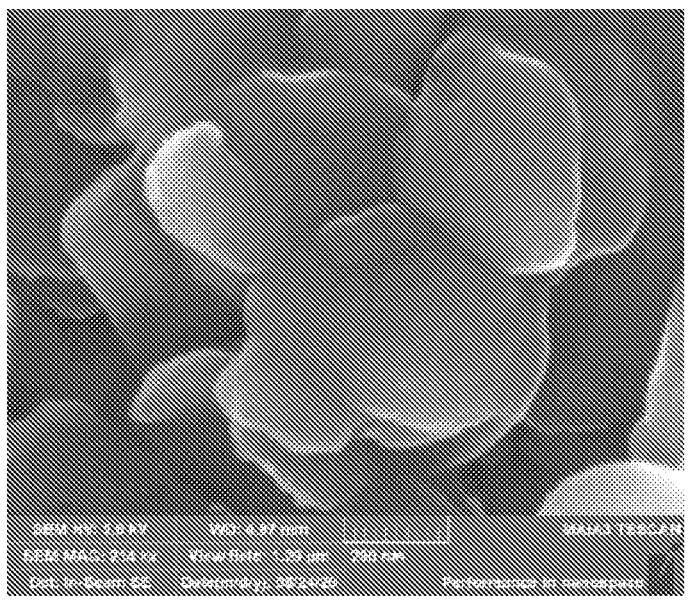
FIG. 2 is a high-power scanning electron microscope (SEM) image of the nitrogen-phosphorus doped porous carbon N4P4C-900 prepared in example 2 of the present disclosure.

The nitrogen-phosphorus doped porous carbon materials obtained in the examples and the comparative examples above were characterized and tested according to the following scheme:

First, the representative nitrogen-phosphorus doped porous carbon material $N_4P_4C$-900 prepared in the second example embodiment exhibits a large amount of scattered coarse carbon under a low-resolution scanning electron microscope (SEM), as shown in FIG. 1, which can provide abundant specific surface area and pore structures; furthermore, under a high-resolution SEM, as shown in FIG. 2, it can be seen that the carbon material has very thin lamellae, different hierarchical edges and a certain degree of cross-linking among different carbons; such structures are conducive to electron transfer and related substance transmission.

Figure 3:
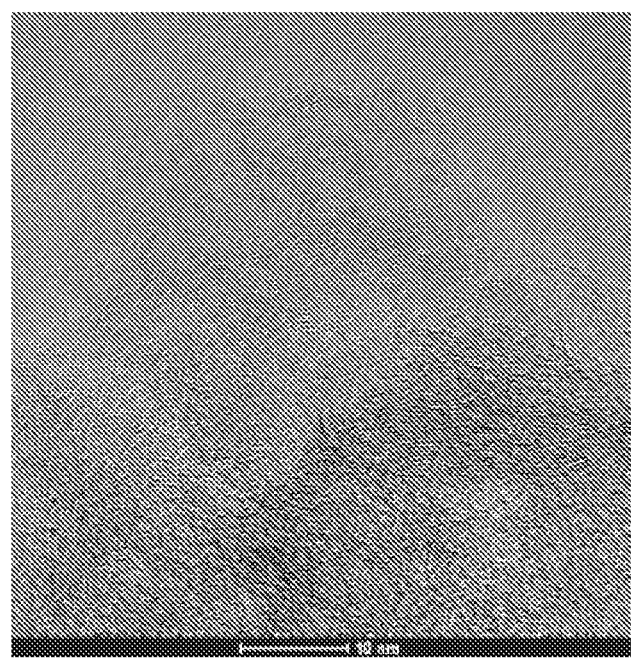
FIG. 3 is a high-resolution transmission electron microscope (HRTEM) image of the nitrogen-phosphorus doped porous carbon N4P4C-900 prepared in example 2 of the present disclosure.

Second, a transmission electron microscope (TEM) test was carried out for $N_4P_4C$-900, as shown in FIG. 3. The high-power TEM image shows that the material has scattered lattice fringe, and it can be observed that the material is composed of several thinner layers at the edge, which represent a disordered characteristic dominated by the material, accompanied by a localized degree of graphitization. Meanwhile, there are abundant defect sites among disordered lattices. Both the nitrogen doping process under a joint action of melamine and potassium hydroxide in the first step and the phosphoric acid etching process in the second step have created certain pores; and the phosphoric acid in the second step can etch carbon at high temperature to make it thinner and have more edge sites, which are conductive to the accessibility of the electrolyte and oxygen in the subsequent catalytic process. Under the etching action of the phosphoric acid in the second step, some nitrogen atoms are removed, the lattices of carbon are reshaped, and doped phosphorus atoms are introduced, thereby corresponding internal vacancy defects, topological defects and edge defects are introduced, and more catalytic active sites are formed.

Figure 4:
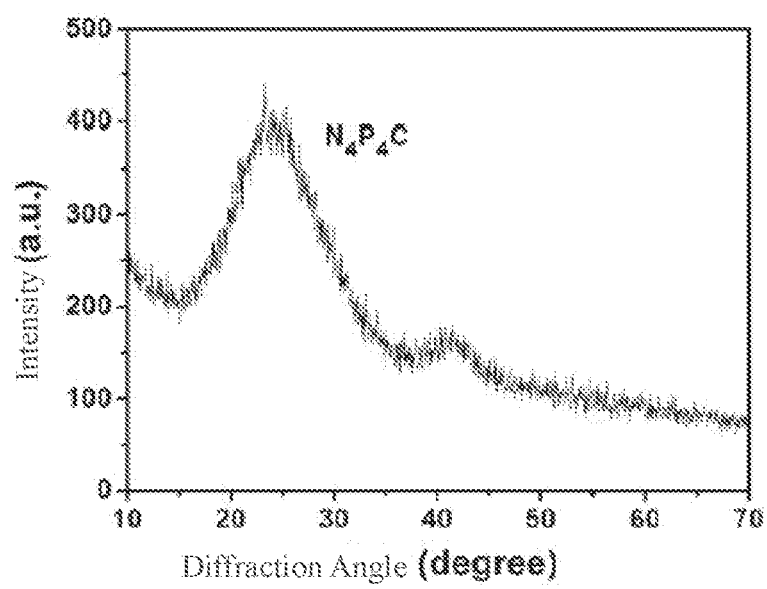
FIG. 4 is an X-Ray Diffraction (XRD) image of the nitrogen-phosphorus doped porous carbon N4P4C-900 prepared in example 2 of the present disclosure.

Third, FIG. 4 is an XRD test image of the $N_4P_4C$-900 material, exhibiting two characteristic peaks at about 24.1° and 41.6°, which are attributed to the planes (002) and (101)

of graphite carbon respectively. The result indicates that the $N_4P_4C$-900 has a high degree of disorder, and indirectly proves that the material has a large quantity of pores. All are conductive to the infiltration of electrolyte ions and the transfer of related species.

Figure 5:
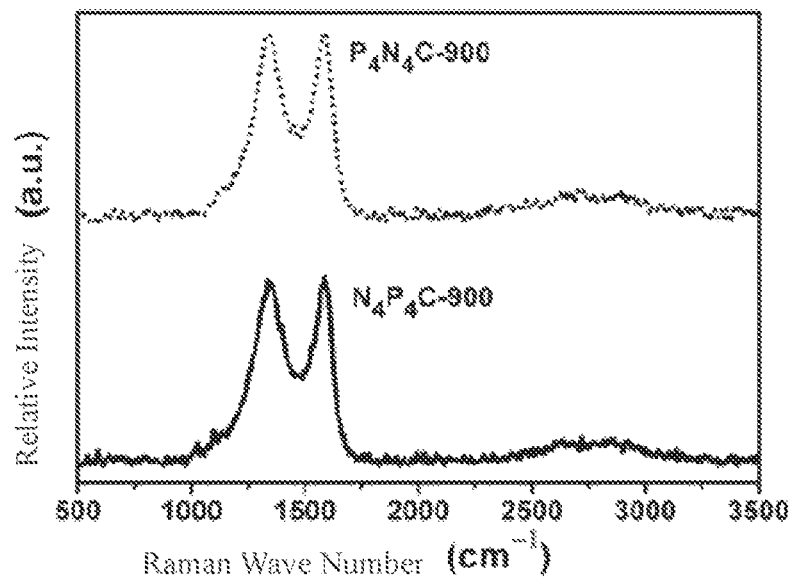
FIG. 5 is a Raman spectrogram of the nitrogen-phosphorus doped porous carbon P4N4C-900 and N4P4C-900 prepared in examples 1 and 2 of the present disclosure.

Fourth, a Raman spectroscopy test was carried out on $P_4N_4C$-900 and $N_4P_4C$-900 respectively, as shown in FIG. 5. The two materials exhibit two strong peaks at about 1,338 cm$^{-1}$ and 1,586 cm$^{-1}$, namely, a D band and a G band, wherein the D band represents the degree of disorder/defects of the material, and the G band represents the degree of graphitization of the material. The value of $I_D/I_G$ reflects the degree of disorder/graphitization of the carbon material, and is 0.984 for $P_4N_4C$-900 and 0.988 for $N_4P_4C$-900 respectively, which indicate that both of the two carbon materials have disordered and graphitized structures. Moreover, the two-step doping process of nitrogen/phosphorus atoms has brought a certain degree of defects to the two materials.

Figure 6:
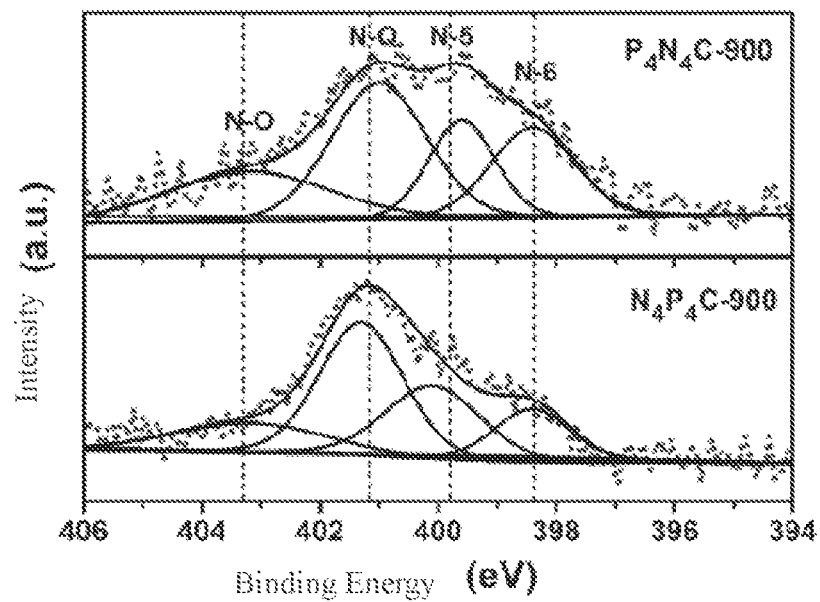
FIG. 6 is a nitrogen peak fitting diagram of X-Ray Photoelectron Spectroscopy (XPS) of the nitrogen-phosphorus doped porous carbon P4N4C-900 and N4P4C-900 prepared in examples 1 and 2 of the present disclosure.
Figures 7, 8:
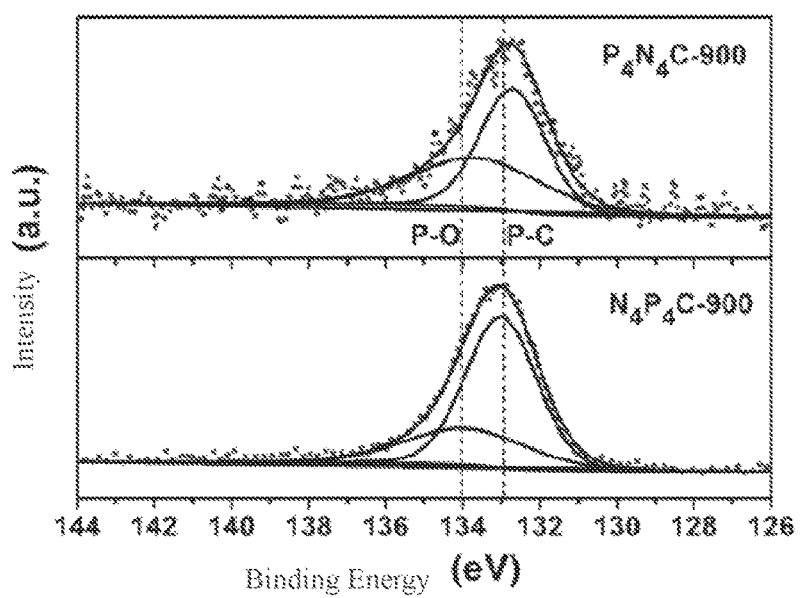
FIG. 7 shows the detailed data of XPS surface components of the obtained typical carbon disclosure.
FIG. 8 is a phosphorus peak fitting diagram of X-Ray Photoelectron Spectroscopy (XPS) of the nitrogen-phosphorus doped porous carbon P4N4C-900 and N4P4C-900 prepared in examples 1 and 2 of the present disclosure.

Fifth, an X-ray photoelectron spectroscopy (XPS) analyzer was used to test the surface elements and their contents of the materials for the samples of the first and second example embodiments. Both of $P_4N_4C$-900 and $N_4P_4C$-900 have high carbon content and certain contents of oxygen, nitrogen and phosphorus. FIG. 6 is a high-resolution nitrogen peak fitting diagram of $P_4N_4C$-900 and $N_4P_4C$-900. $P_4N_4C$-900 and $N_4P_4C$-900 contain 2.0% and 2.64% nitrogen atoms respectively. According to the peak fitting calculation, $P_4N_4C$-900 contains 21.6% pyridine nitrogen (N-6), 18.6% pyrrole nitrogen (N-5), 37.0% graphite nitrogen (N-Q) and 22.8% nitric oxide (N-O); $N_4P_4C$-900 contains 15.3% pyridine nitrogen, 26.2% pyrrole nitrogen, 41.8% graphite nitrogen and 16.7% nitric oxide, as shown in FIG. 7. FIG. 8 is a high-resolution phosphorus peak fitting diagram of $P_4N_4C$-900 and $N_4P_4C$-900; according to the peak fitting calculation, $P_4N_4C$-900 has 0.49% phosphorus content, including 55.6% P—C bonds and 44.4% P—O bonds; N4P4C-900 has 2.42% phosphorus content, including 70.2% P—C bonds and 29.8% P—O bonds. It can be seen that $N_4P_4C$-900 has more nitrogen content and phosphorus content than $P_4N_4C$-900, and the proportions of graphite nitrogen and P—C bonds in $N_4P_4C$-900 are more prominent. In the $P_4N_4C$-900 prepared with the method in the first example embodiment, the nitrogen content and phosphorus content are 2.0% and 0.5% respectively, the ratio of graphite nitrogen to pyridine nitrogen is 1.71, and the ratio of P—C bonds to P—O bonds is 1.25; compared with $P_4C$-900, the nitrogen content is increased slightly but the phosphorus content is decreased greatly. In the $N_4P_4C$-900 prepared with the method in the second example embodiment, the nitrogen content and phosphorus content are 2.64% and 2.42% respectively, the ratio of graphite nitrogen to pyridine nitrogen is 2.72, and the ratio of P—C bonds to P—O bonds is 2.35; compared with $N_4C$-900, the nitrogen content is decreased slightly, the phosphorus content is increased greatly, and the doping contents and types of heteroatoms can be controlled accurately. Graphite nitrogen and P—C bonds can change the charge density and spin density of adjacent carbons, and act as active species in oxygen reduction electrocatalysis. Pyridine nitrogen can also play a synergistic role, and oxygen-related functional groups can improve the wettability of the material. In addition, the graphite nitrogen species is also conductive to the electrical conductivity of carbon materials.

Figures 9, 10:
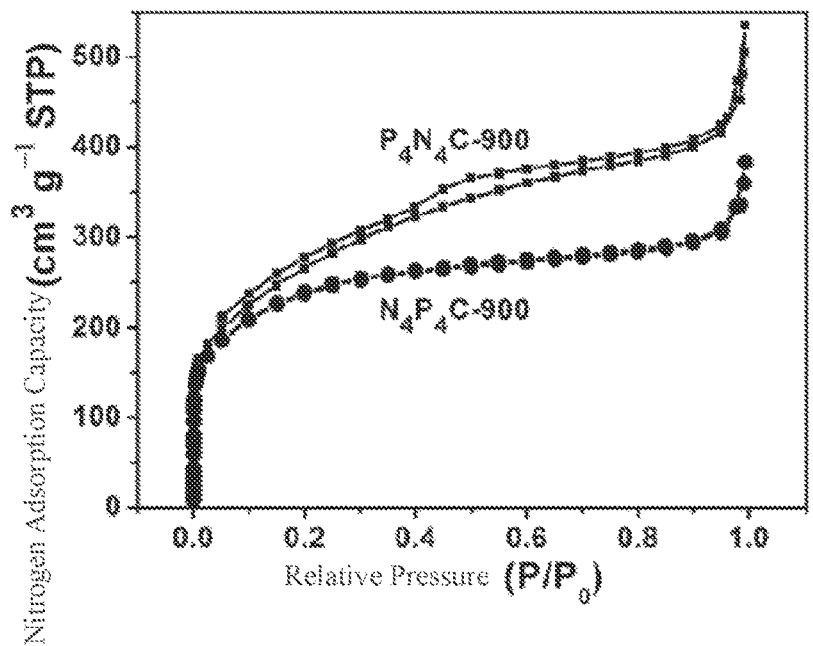
FIG. 9 shows the nitrogen adsorption/desorption curves of the nitrogen-phosphorus doped porous carbon P4N4C-900 and N4P4C-900 prepared in examples 1 and 2 of the present disclosure.
FIG. 10 shows the detailed data of the obtained typical carbon materials related to specific surface areas and pores.
Figure 11:
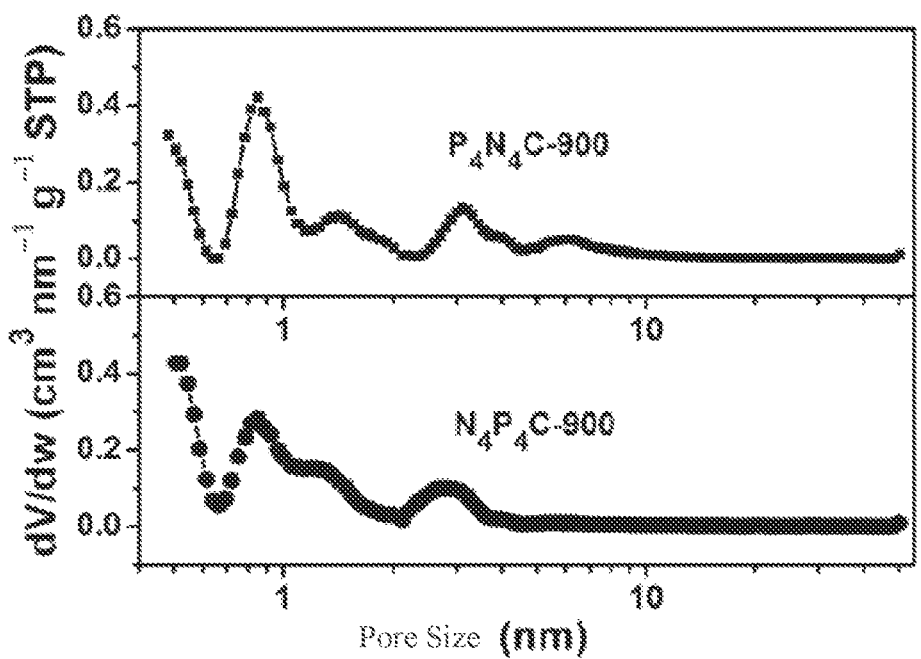
FIG. 11 is a graph of the pore size distribution based on a Density Functional Theory (DFT) model of the nitrogen-phosphorus doped porous carbon P4N4C-900 and N4P4C-900 prepared in examples 1 and 2 of the present disclosure.

Sixth, the specific surface area and pore structure of the samples in the first and second example embodiments were tested with a physical nitrogen adsorption tester. FIG. 9 is a nitrogen adsorption/desorption diagram of $P_4N_4C$-900 and $N_4P_4C$-900. Both of the materials are typical microporous materials, and the trend of the curves approaching vertical in the low pressure range near zero also confirms the presence of a large quantity of micropores in the materials. The test result indicates that the specific surface areas of $P_4N_4C$-900 and $N_4P_4C$-900 are 1,220.7 m$^2\cdot$g$^{-1}$ and 845.5 m$^2\cdot$g$^{-1}$, respectively; and the pore volumes are 1.135 cm$^3\cdot$g$^{-1}$ and 0.594 cm$^3\cdot$g$^{-1}$ respectively. $P_4N_4C$-900 has micropores with 503.2 m$^2\cdot$g$^{-1}$ specific surface area and mesopores with 717.5 m$^2\cdot$g$^{-1}$ specific surface area; the specific surface area of $P_4N_4C$-900 is further increased compared with $P_4C$-900, which has 866.2 m$^2\cdot$g$^{-1}$ specific surface area, wherein the specific surface area of micropores is decreased but the specific surface area of mesopores is greatly increased. $N_4P_4C$-900 has micropores with 661.8 m$^2\cdot$g$^{-1}$ specific surface area and mesopores with 183.7 m$^2\cdot$g$^{-1}$ specific surface area; the specific surface area of $N_4P_4C$-900 is significantly increased compared with $N_4C$-900, which has 629.8 m$^2\cdot$g$^{-1}$ specific surface area, wherein both the specific surface areas of micropores and mesopores are increased, and the specific surface area of mesopores is approximately doubled, as shown in FIG. 10, which proves that the specific surface areas of $P_4N_4C$-900 and $N_4P_4C$-900 have good controllability of variation. Through DFT model analysis, the pore size distribution curves of $P_4N_4C$-900 and $N_4P_4C$-900 are obtained, as shown in FIG. 11; the pore size distribution of the $P_4N_4C$-900 sample is concentrated at 0.50 nm, 0.85 nm and 3.14 nm, and the pore size distribution of the $N_4P_4C$-900 sample is concentrated at 0.52 nm, 0.83 nm and 2.71 nm, respectively. The materials prepared in the examples 1 and 2 have high pore size controllability. It can be seen that both $P_4N_4C$-900 and $N_4P_4C$-900 have micropores with larger pore size and a certain proportion of mesopores; the micropores can provide practical reaction sites for catalytic reactions, and the mesopores can facilitate mass transfer and transfer of related substances; under a synergistic effect of the micropores and the mesopores, more active sites are brought into play, thus excellent catalytic efficiency is ensured.

Seventh, the working electrode was prepared as follows: 3-5 mg prepared nitrogen-phosphorus doped porous carbon material was weighed and loaded into a centrifugal tube, then 80-160 μL isopropyl alcohol, 160-320 μL water and 10-20 μL perfluorosulfonic acid-polytetrafluoroethylene copolymer were added to prepare 250-500 μL suspension; the suspension was treated ultrasonically for 30 minutes to form a well-dispersed black mucus, and then 5-15 μL mucus was dropped on a glassy carbon electrode; then the glassy carbon electrode was air-dried to prepare a working electrode. An Ag/AgCl electrode was used as a reference electrode, and a platinum wire was used as a counter electrode to carry out an oxygen reduction electrocatalysis performance test on a workstation. Similarly, 20% Pt/C was made into a black mucus according to the above preparation method, and dropped on a glassy carbon electrode, then the glassy carbon electrode was air-dried and tested, and compared with the material prepared in the present disclosure, wherein the load of the Pt/C catalyst on the glassy carbon electrode was kept at about 100 μg·cm$^{-2}$.

CV test, LSV test, RRDE test, cyclic stability test, methanol and small molecules resistance test, and alkaline zinc-air cell test were carried out on the sample N4P4C-900 prepared in the second example embodiment and 20% Pt/C in 0.1 mol·L$^{-1}$ KOH solution in thermostatic water bath at 25° C., as shown in FIGS. 12-21.

Figure 12:
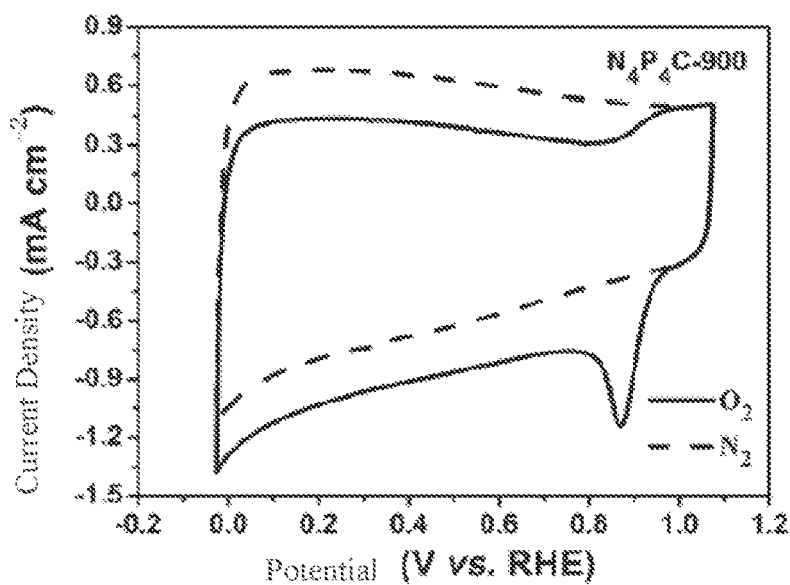
FIG. 12 is a cyclic voltammetry curve (CV) diagram of the nitrogen-phosphorus doped porous carbon N4P4C-900 prepared in example 2 of the present invention in 0.1 mol·L−1 KOH disclosure.
Figure 13:
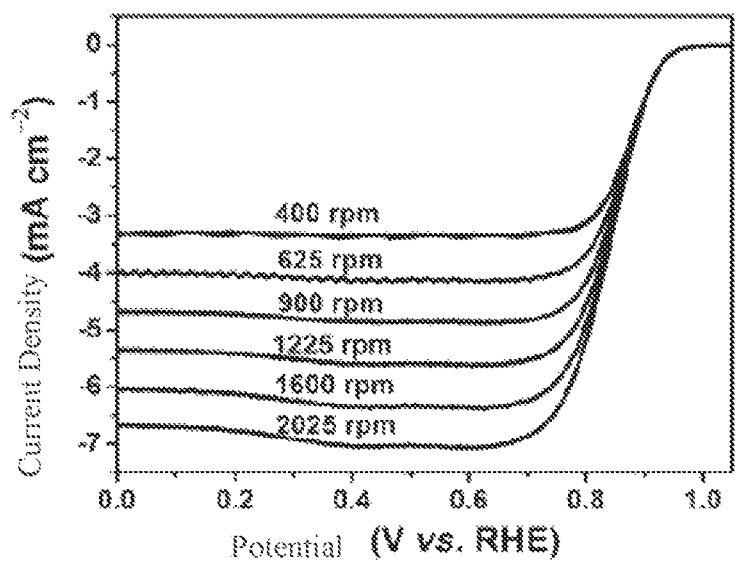
FIG. 13 is a linear scanning voltammetry curve (LSV) diagram of the nitrogen-phosphorus doped porous carbon N4P4C-900 prepared in example 2 of the present invention at different rotational speeds at 10 mV·s−1 in 0.1 mol·L−1 KOH solution.
Figure 14:
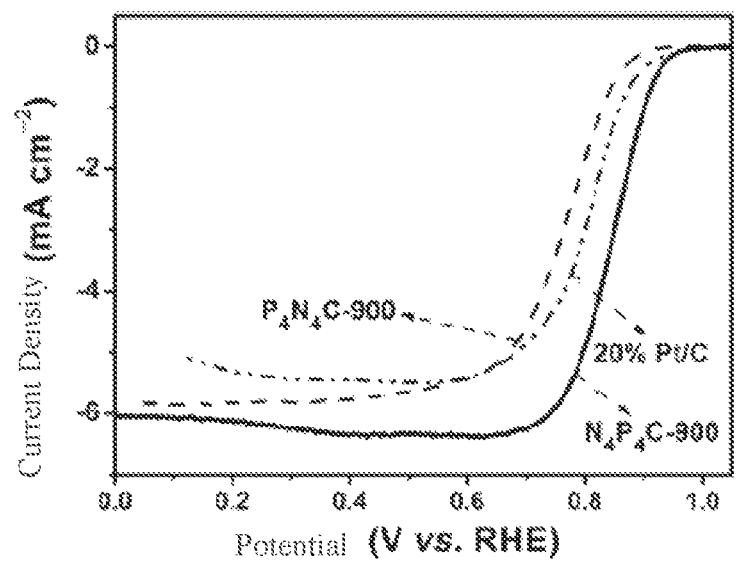
FIG. 14 is a LSV comparison diagram of the nitrogen-phosphorus doped porous carbon P4N4C-900 and N4P4C-900 prepared in examples 1 and 2 of the present invention and 20% Pt/C at 1600 rpm at 10 mV·s−1 in 0.1 mol·L−1 KOH solution.
Figure 15:
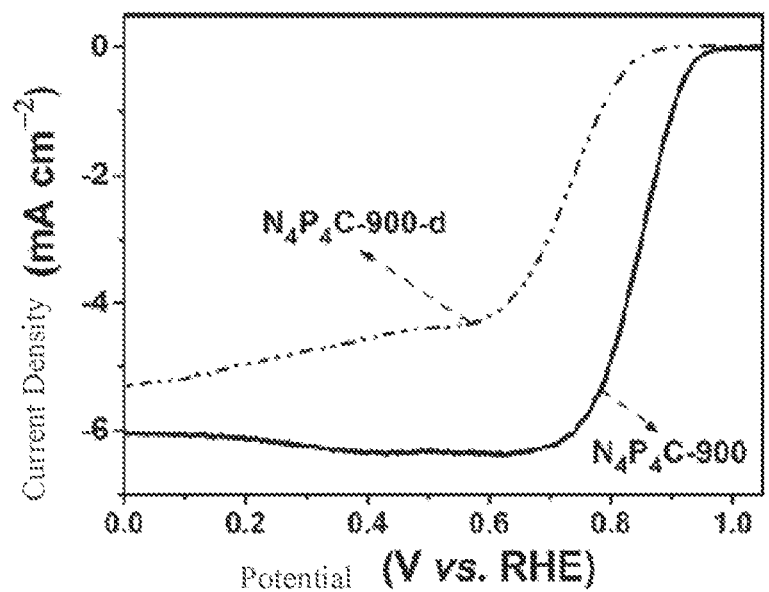
FIG. 15 is a LSV comparison diagram of the nitrogen-phosphorus doped porous carbon N4P4C-900 and N4P4C-900-d prepared in examples 2 and 3 of the present invention at 1600 rpm at 10 mV·s−1 in 0.1 mol·L−1 KOH solution.
Figure 16:
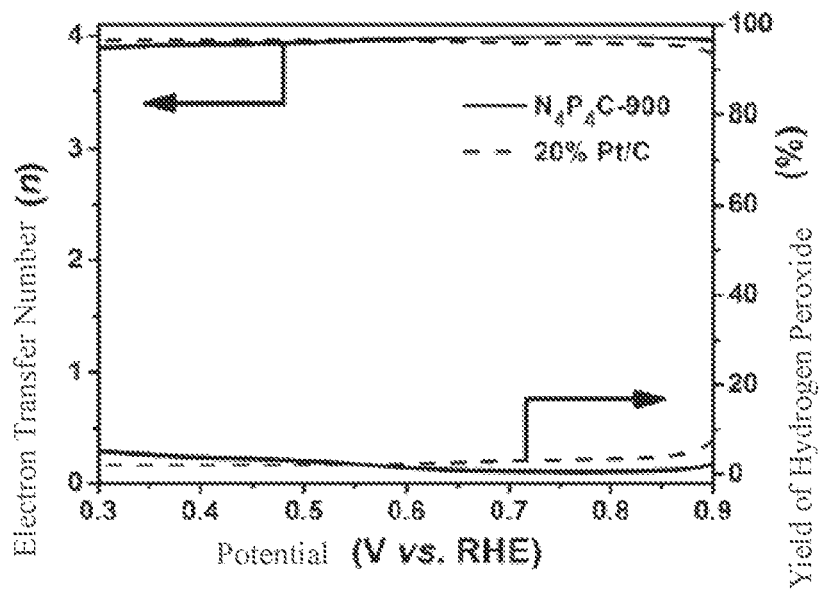
FIG. 16 is a graph of hydrogen peroxide yield and electron transfer number of the nitrogen-phosphorus doped porous carbon N4P4C-900 prepared in example 2 of the present invention and 20% Pt/C in 0.1 mol·L−1 KOH solution as measured in a Rotating Ring-Disk Electrode (RRDE) test.

It can be seen from FIG. 12: $N_4P_4C$-900 exhibits an approximately rectangular electrochemical characteristic in $N_2$, which is attributed to the capacitance characteristics of the material; it has an excellent redox peak in $O_2$, with a peak potential of 0.872 V vs. RHE, which indicates that the prepared electrode material has a better catalytic potential. FIG. 13 shows the LSV curves of $N_4P_4C$-900 at different rotational speeds, wherein the current density increases uniformly with the increase of the rotational speed. In the high potential region, the material exhibits an excellent catalytic potential, which is derived from kinetic control; in the low potential region, the material exhibits an excellent current density, which is derived from oxygen diffusion control. It can be seen from FIG. 14 that $N_4P_4C$-900 exhibits initial potential and half-wave potential superior to those of 20% Pt/C as well as those of $P_4N_4C$-900. $N_4P_4C$-900 has 0.97 V initial potential, 0.85 V half-wave potential and 6.36 mA·cm$^{-2}$ limiting current density at standard RHE potential. In addition, FIG. 15 proves that the $N_4P_4C$-900 prepared through frequency-conversion ultrasonic mixing method has significantly better performance than the $N_4P_4C$-900-d prepared through direct mixing, which highlights the importance of the frequency-conversion ultrasonic mixing method developed in this patent application for the properties and electrochemical performance of the prepared material! As shown in FIG. 16, the RRDE test and calculation indicates: at a potential of 0.3-0.9 V vs. RHE, the yield of hydrogen peroxide with $N_4P_4C$-900 is lower than 2.13%, and the electron transfer number is higher than 3.96, equivalent to that of Pt/C, which proves that the oxygen reduction electrocatalysis process with $N_4P_4C$-900 follows a dominant four-electron path. The outstanding catalytic performance of $N_4P_4C$-900 under an alkaline condition benefits from the abundant active sites related to nitrogen and phosphorus and the interconnected micropore-mesopore structures for mass transfer brought by the two-step pyrolysis process of nitrogen doping followed by phosphorus etching.

Figure 17:
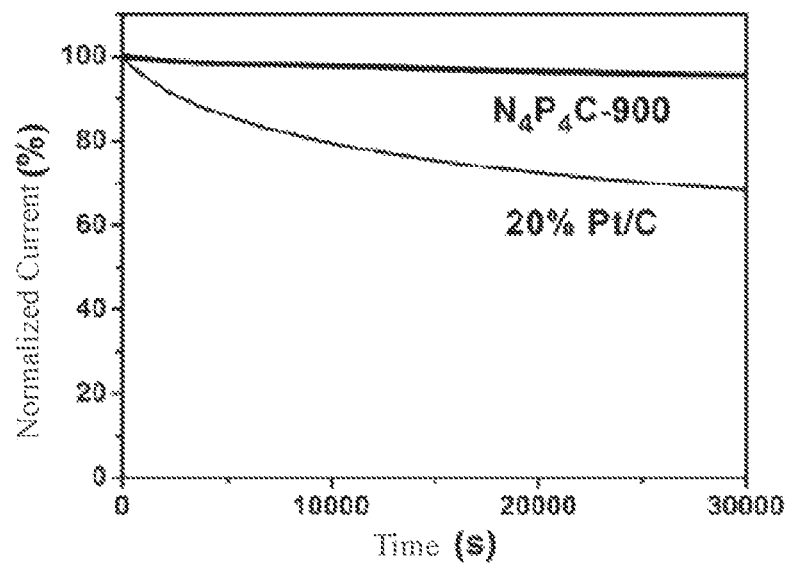
FIG. 17 is a cyclic stability diagram of the nitrogen-phosphorus doped porous carbon N4P4C-900 prepared in example 2 of the present invention and 20% Pt/C at 0.82 V vs. RHE at 400 rpm in 0.1 mol·L−1 KOH solution.
Figure 18:
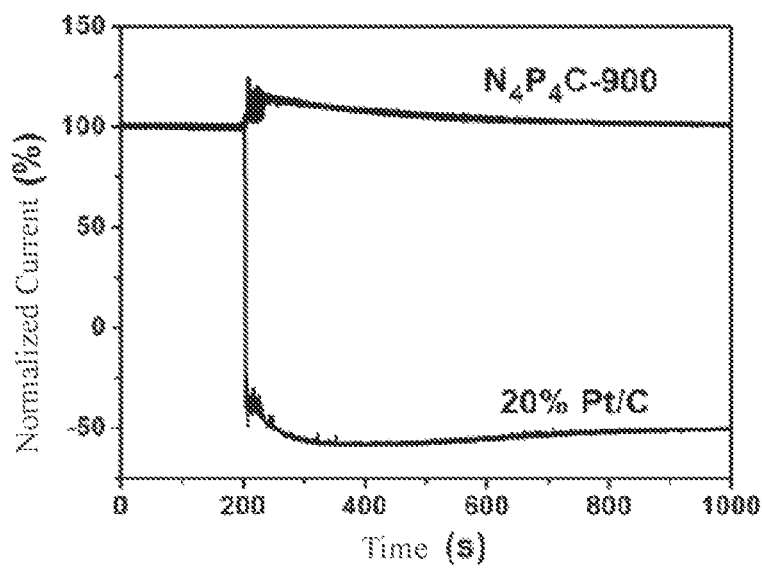
FIG. 18 is a comparison diagram of chronoamperometry of the nitrogen-phosphorus doped porous carbon N4P4C-900 prepared in example 2 of the present invention and 20% Pt/C in 0.1 mol·L−1 KOH solution before and after 1 mol·L−1 methanol is added.
Figure 19:
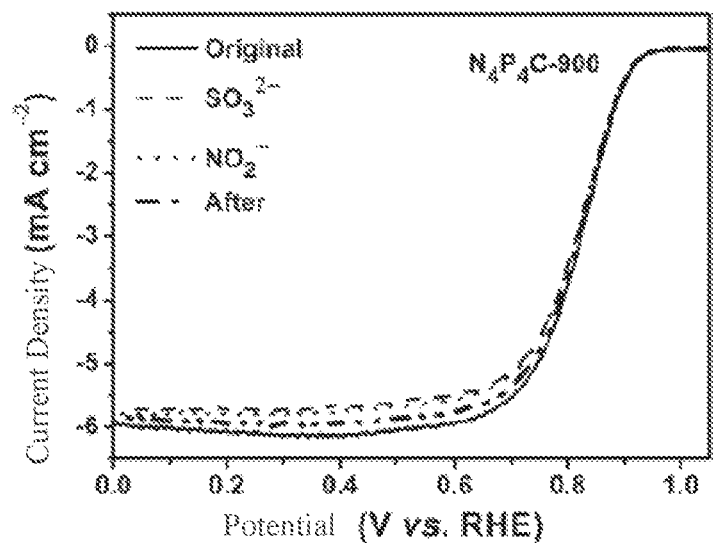
FIG. 19 is a LSV comparison diagram of the nitrogen-phosphorus doped porous carbon N4P4C-900 prepared in example 2 of the present invention at 1600 rpm in 0.1 mol·L−1 KOH solution before and after NO2— and SO32— are added.
Figure 20:
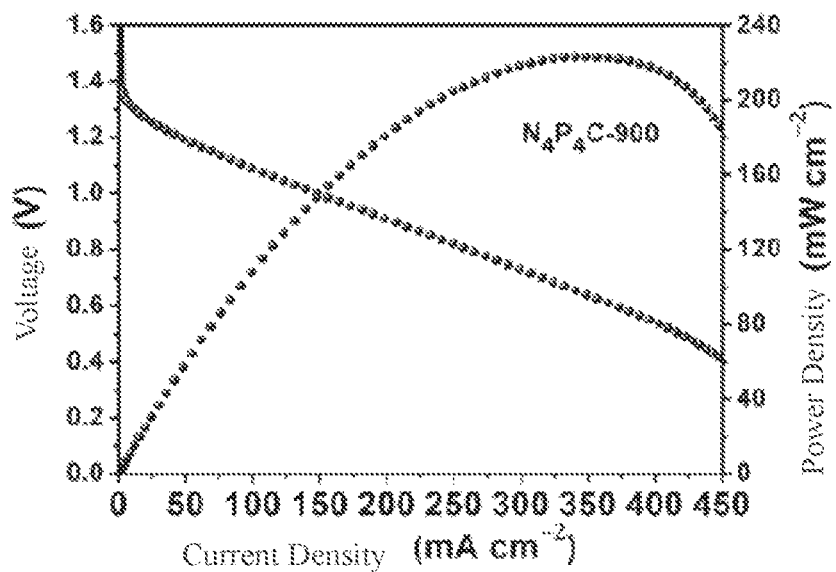
FIG. 20 is a diagram of the polarization curve and power density of the nitrogen-phosphorus doped porous carbon N4P4C-900 prepared in example 2 of the present invention measured in a zinc-air cell with 6.0 mol·L−1 KOH solution as the electrolyte.
Figure 21:
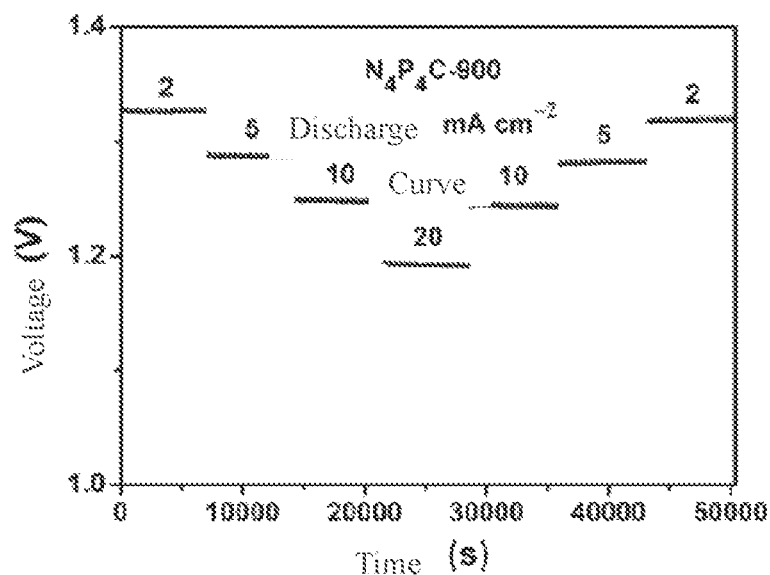
FIG. 21 is a constant current discharge diagram of the nitrogen-phosphorus doped porous carbon N4P4C-900 prepared in example 2 of the present invention and 20% Pt/C at different current densities measured in a zinc-air cell with 6.0 mol·L−1 KOH solution as the electrolyte.

The $N_4P_4C$-900 in the second example embodiment was tested by i-t chronoamperometry at 400 rpm in 0.1 mol·L$^{-1}$ KOH electrolyte, and at the same time 20% Pt/C was tested under the same conditions for comparison, as shown in FIG. 17. The current retention rate of $N_4P_4C$-900 after a 30,000 seconds cycle was 95.45%, which was much higher than 68.40% of 20% Pt/C. The $N_4P_4C$-900 in the second example embodiment and 20% Pt/C were tested for methanol resistance in 0.1 mol·L$^{-1}$ KOH electrolyte, as shown in FIG. 18. In the i-t chronoamperometry test, when methanol was added at 200 s, the catalytic activity of $N_4P_4C$-900 remained unchanged essentially, while the Pt/C catalyst had obvious methanol oxidation reaction. The $N_4P_4C$-900 in the second example embodiment was tested for its small organic molecules ($NaNO_2$ and $NaHSO_3$) resistance in 0.1 mol·L$^{-1}$ KOH electrolyte, as shown in FIG. 19, after $NaNO_2$ and $NaHSO_3$ were added into the electrolyte respectively, the catalytic performance of $N_4P_4C$-900 remained relatively stable, and the catalytic performance can be almost fully recovered after replacement of fresh electrolyte. It proves that the nitrogen-phosphorus co-doped carbon material prepared in the present disclosure has excellent cyclic stability and methanol and small molecules resistance under an alkaline condition. Those features benefit from the stable active sites and pore structures of the material. When $N_4P_4C$-900 was used as a cathode catalyst in an alkaline zinc-air cell, the maximum power density of the cell could be up to 223.2 mW·cm$^{-2}$, as shown in FIG. 20. In addition, the cell can discharge stably for a long time at different current densities, and has good electrochemical reaction reversibility, as shown in FIG. 21. $N_4P_4C$-900 exhibits a great potential of application in alkaline fuel cells and metal-air cells.

Figure 22:
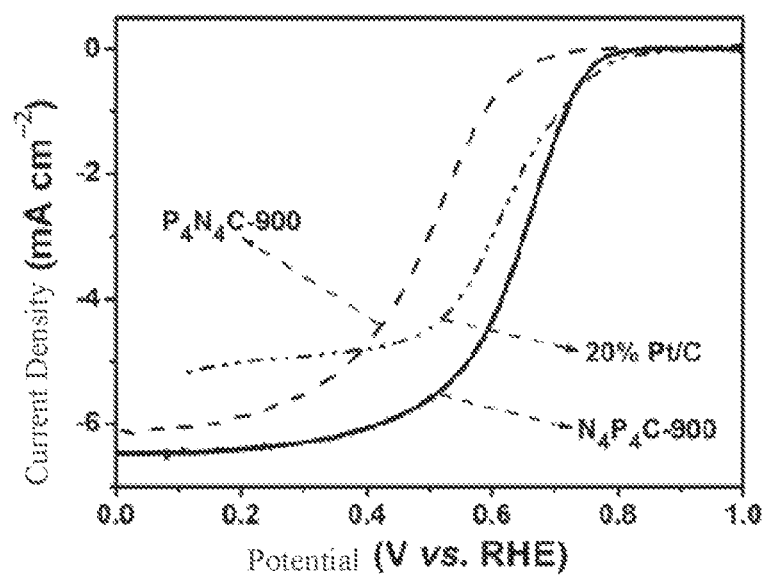
FIG. 22 is a LSV comparison diagram of the nitrogen-phosphorus doped porous carbon P4N4C-900 and N4P4C-900 prepared in examples 1 and 2 of the present invention and 20% Pt/C at 1600 rpm at 10 mV·s−1 in 0.5 mol·L−1 H2SO4 solution.

Eighth, a LSV test was carried out on the sample $N_4P_4C$-900 prepared in the second example embodiment and 20% Pt/C in 0.5 mol·L$^{-1}$ $H_2SO_4$ solution. As shown in FIG. 22, $N_4P_4C$-900 exhibits a half-wave potential and a limiting current density superior to those of 20% Pt/C and obviously superior to those of $P_4N_4C$-900 as well. $N_4P_4C$-900 has 0.82 V initial potential, 0.65 V half-wave potential and 6.48 mA·cm$^{-2}$ limiting current density at standard RHE potential. This indicates that the material $N_4P_4C$-900 still has an outstanding catalytic effect under an acidic condition. The outstanding catalytic performance of $N_4P_4C$-900 under an acidic condition benefits from the high proportions of graphite nitrogen and P—C bond species and abundant defects obtained through the two-step sequential doping process.

Figure 23:
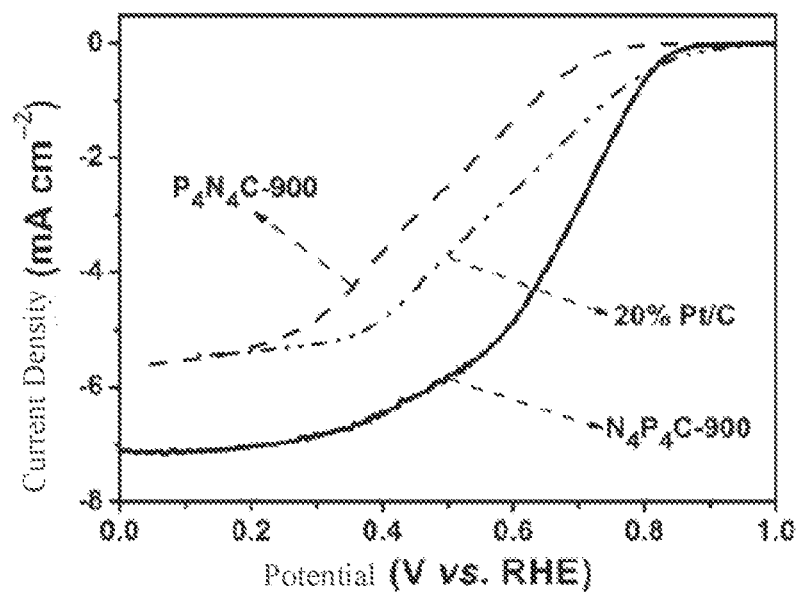
FIG. 23 is a LSV comparison diagram of the nitrogen-phosphorus doped porous carbon P4N4C-900 and N4P4C-900 prepared in examples 1 and 2 of the present invention and 20% Pt/C at 1600 rpm at 10 mV·s−1 in a phosphate buffer solution (0.1 M PBS, pH=7.0).

Ninth, a LSV test was carried out on the sample $N_4P_4C$-900 prepared in the example 2 and 20% Pt/C in 0.1 mol·L$^{-1}$ PBS (pH=7). As shown in FIG. 23, $N_4P_4C$-900 exhibits a half-wave potential and a limiting current density superior to those of 20% Pt/C and obviously superior to those of $P_4N_4C$-900 as well. $N_4P_4C$-900 has 0.87 V initial potential, 0.67 V half-wave potential and 7.12 mA·cm$^{-2}$ limiting current density at standard RHE potential. This indicates that the material has a great potential of being applied in bio-fuel cells. The outstanding catalytic performance of $N_4P_4C$-900 under a neutral condition benefits from the nitrogen and phosphorus doping sites and abundant defects and pore structures suitable for neutral ions to play their roles, which are obtained through the two-step sequential doping process.

Figure 24:
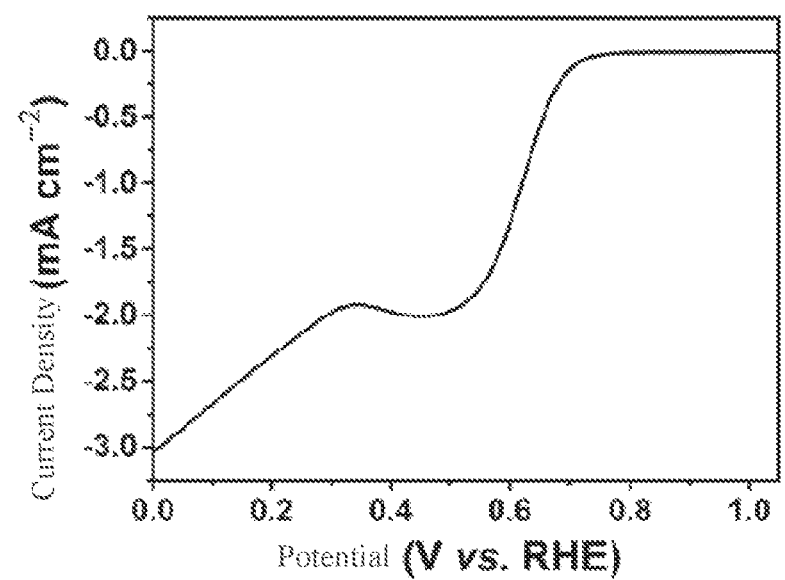
FIG. 24 is a LSV diagram of the nitrogen-phosphorus doped carbon 1 prepared in comparative example 1 of the present invention at 1600 rpm at 10 mV·s−1 in 0.1 mol·L−1 KOH.

Tenth, Nitrogen-phosphorus doped carbon 1 obtained according to the first comparative example embodiment can be used as electrode material for supercapacitors, as described in the Patent CN107610945A. However, via an ORR electrocatalysis test, as shown in FIG. 24, the representative nitrogen-phosphorus doped carbon 1 has poor electrocatalytic performance in alkaline 0.1 M KOH electrolyte, and doesn't have a potential of being applied as a cathode catalyst in fuel cells. This also highlights the importance of the method in the first and second example embodiments of the present disclosure for obtaining oxygen reduction catalysts applicable within a wide pH range.

Figure 25:
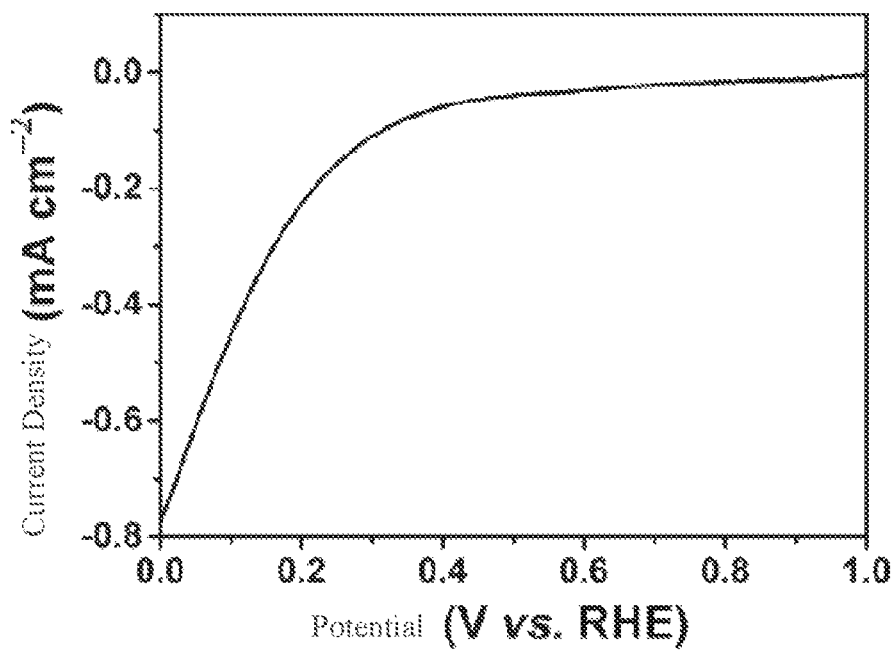
FIG. 25 is a LSV diagram of the nitrogen-phosphorus doped carbon 2 prepared in comparative example 2 of the present invention at 1600 rpm at 10 mV·s−1 in 0.5 mol·L−1 H2SO4.
Figure 26:
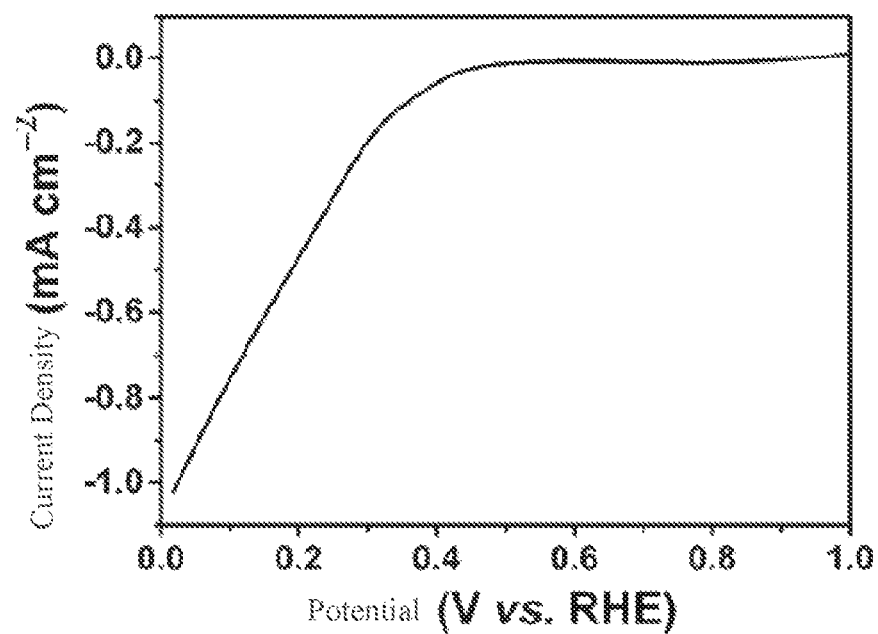
FIG. 26 is a LSV diagram of the nitrogen-phosphorus doped carbon 2 prepared in comparative example 2 of the present invention at 1600 rpm at 10 mV·s−1 in 0.1 mol·L−1 PBS.

The nitrogen-phosphorus doped carbon 2 obtained according to the second comparative example embodiment has certain electrocatalytic activity in alkaline 0.1 M KOH electrolyte, as described in the Patent CN105762376A. However, via an ORR electrocatalysis test under acidic and neutral conditions, as shown in FIGS. 25 and 26, the representative nitrogen-phosphorus doped carbon 2 has poor electrocatalytic performance in 0.5 M $H_2SO_4$ and 0.1 M PBS (pH=7.0), and doesn't have a potential of being applied as a cathode catalyst for proton exchange membrane fuel cells and microbial fuel cells. This also highlights the importance of the method in the first and second example embodiments of the present disclosure for obtaining oxygen reduction catalysts applicable within a wide pH range.

Likewise, the nitrogen-phosphorus doped carbon 3 obtained according to the third comparative example embodiment has certain electrocatalytic activity in alkaline 0.1 M KOH electrolyte, as described in the Patent CN107661772B. However, that patent hasn't mentioned the ORR electrocatalytic performance of the material under acidic and neutral conditions, which implies that the representative nitrogen-phosphorus doped carbon 3 has insufficient electrocatalytic performance in acidic and neutral electrolytes, and doesn't have a potential of being applied as a cathode catalyst under acidic and neutral conditions. This also highlights the importance of the method in the first and second example embodiments of the present disclosure for obtaining oxygen reduction catalysts applicable within a wide pH range.

The embodiments described above are merely used for explaining design thoughts and features of the present disclosure, the purpose of which is to enable those skilled in the art to understand the technical content of the present disclosure and thereby implement the present disclosure, the protection scope of the present disclosure is not limited to the embodiments described above. Therefore, any equivalent variations or modifications made on the basis of the principle and design idea disclosed in the present disclosure shall be deemed as falling into the protection scope of the present disclosure.

What is claimed is:

1. A preparation method of nitrogen-phosphorus doped porous carbon material for oxygen reduction electrocatalysis within a wide pH range, comprising:
   (1) cleaning and drying natural mineral-based carbon sources, and mixing the natural mineral-based carbon sources for ball milling; pre-carbonizing the obtained mixture in a shielding gas; washing the pre-carbonized mixture with 2-3 mol·L$^{-1}$ potassium hydroxide solution at 80-90° C. for 1-3 hours, filtering, and re-washing with water till the filtrate is neutral; pickling the washed pre-carbonized mixture with 4-6 mol·L$^{-1}$ hydrochloric acid solution at 50-60° C. for 1-3 hours, filtering, washing with water till the filtrate is neutral, and drying the pickled product;
   (2) weighing the product to be doped from step (1) or (3), a nitrogen dopant and an activator respectively at a mass ratio of 1: (2-6): (1-3), milling and mixing, and transferring the mixture into a tube furnace, carbonizing at 850-1,050° C. for 1-4 hours in a nitrogen atmosphere at a heating rate of 2-20° C. ·min$^{-1}$, taking out the resultant product after the carbonization is finished, and then pickling, filtering, washing with water, and drying, so that a nitrogen-doped carbon is obtained;
   (3) weighing the product to be doped from step (1) or (2) and a phosphorus dopant respectively at a mass ratio of 1: (3-5), adding water for dilution and mixing, drying and transferring the mixture into a tube furnace, carbonizing at 850-1,050° C. for 1-4 hours in a nitrogen atmosphere at a heating rate of 2-20° C.·min$^{-1}$, and pickling, filtering, washing with water, and drying, so that a phosphorus-doped carbon is obtained; and
   (4) pickling the secondarily carbonized product obtained through the above steps in a sequence of (1), (2) and (3) or (1), (3) and (2) with 1 mol·L$^{-1}$ dilute hydrochloric acid solution at 40-60° C. for 1-3 hours, filtering, washing with water till the filtrate is neutral, and drying;
   (5) producing a nitrogen-phosphorus doped porous carbon material having a specific surface area in a range of 800 to 1300 m$^2$·g$^{-1}$, wherein a specific surface area of micropores is in a range of 500 to 700 m$^2$·g$^{-1}$ and a specific surface area of mesopores in a range of 100 to 800 m$^2$·g$^{-1}$, and wherein the nitrogen-phosphorus doped porous carbon material comprises a nitrogen content and phosphorus content of 2.64% and 2.42% respectively, a ratio of graphite nitrogen to pyridine nitrogen in the range of 1.5 to 3, and a ratio of P-C bonds to P-O bonds in the range of 1 to 2.5.

2. The preparation method of claim 1, wherein a nitrogen-phosphorus doped porous carbon N$_4$P$_4$C-900 prepared through the steps of (1), (2) and (3) has specific surface area of 845.5 m$^2$·g$^{-1}$, wherein a specific surface area of micropores is 661.8 m$^2$·g$^{-1}$ and a specific surface area of mesopores is 183.7 m$^2$·g$^{-1}$, and wherein a nitrogen content and phosphorus content are 2.64% and 2.42% respectively, and a ratio of graphite nitrogen to pyridine nitrogen is 2.72, and a ratio of P-C bonds to P-O bonds is 2.35.

3. The preparation method of claim 1, wherein a nitrogen-phosphorus doped porous carbon P$_4$N$_4$C-900 prepared through the steps of (1), (3) and (2) has specific surface area of 1,220.7 m$^2$·g$^{-1}$, wherein a specific surface area of micropores is 503.2 m$^2$·g$^{-1}$ and a specific surface area of mesopores is 717.5 m$^2$·g$^{-1}$, and wherein a nitrogen content and phosphorus content are 2.0% and 0.5% respectively, a ratio of graphite nitrogen to pyridine nitrogen is 1.71, and a ratio of P-C bonds to P-O bonds is 1.25.

4. The preparation method of claim 1, wherein in step (3), mixing comprises ultrasonic mixing with an ultrasonic time is 0.5-3 hours and a frequency of frequency-conversion ultrasonic is 25-60 Hz.

5. The preparation method of claim 1, wherein the natural mineral-based carbon source in step (1) is at least one of coal, coal pitch, coal tar, coal tar pitch, petroleum pitch, or petroleum coke.

6. The preparation method of claim 1, wherein the pre-carbonization temperature in step (1) is 600-1,000° C., carbonization is carried out in a nitrogen atmosphere for 2 hours, and a heating rate is 5° C.·min$^{-1}$.

7. The preparation method of claim 1, wherein in step (2), the nitrogen dopant is at least one of melamine, dicyandiamide, urea, pyridine, pyrrole, aniline, amino acid, or purine, and wherein the activator is at least one of potassium hydroxide, sodium hydroxide, potassium bicarbonate, sodium bicarbonate, potassium carbonate, or sodium carbonate.

8. The preparation method of claim 1, wherein in step (3), the phosphorus dopant is at least one of phosphoric acid, triphenylphosphine, phytic acid, red phosphorus, black phosphorus, dipotassium hydrogen phosphate, potassium dihydrogen phosphate, disodium hydrogen phosphate, sodium dihydrogen phosphate, magnesium phosphate, calcium phosphate, ammonium dihydrogen phosphate, or diammonium hydrogen phosphate.

* * * * *